United States Patent [19]
Baumann et al.

[11] Patent Number: 5,943,916
[45] Date of Patent: Aug. 31, 1999

[54] STEERING COLUMN ASSEMBLY UNIT

[75] Inventors: Janet Baumann, Diepholz; Burkhard Schäfer, Ganderkesee, both of Germany

[73] Assignee: Lemförder Metallwaren AG, Stemwede-Dielingen, Germany

[21] Appl. No.: 08/932,207

[22] Filed: Sep. 17, 1997

[30] Foreign Application Priority Data

Sep. 18, 1996 [DE] Germany .......................... 196 38 051

[51] Int. Cl.⁶ .................................................. B62D 1/18
[52] U.S. Cl. ................... 74/493; 74/531; 280/775
[58] Field of Search ............................. 74/493, 492, 531, 74/424.8 A; 280/775, 777; 403/364, 335, 311, 312

[56] References Cited

U.S. PATENT DOCUMENTS

| | | | |
|---|---|---|---|
| 4,098,141 | 7/1978 | Yamaguchi | 74/493 |
| 5,052,716 | 10/1991 | Matsumoto | 74/492 |
| 5,070,741 | 12/1991 | Ervin | 280/775 |
| 5,074,586 | 12/1991 | Baskett | 74/493 |
| 5,282,394 | 2/1994 | Dominique et al. | 403/311 |

FOREIGN PATENT DOCUMENTS 17 80 061 B2   1/1972   Germany .

*Primary Examiner*—John A. Jeffery
*Assistant Examiner*—Marcus Charles
*Attorney, Agent, or Firm*—McGlew and Tuttle, P.C.

[57] ABSTRACT

A steering column assembly unit of a motor vehicle steering column adjustable in height and tilt with a steering axle, a steering column housing accommodating the steering axle, and a fastening device for the detachable fixation of the steering column housing at a bracket that is a rigid part of the body. The fastening device has at least one plate assembly fixed at the steering column housing and the steering column housing includes a one-piece component provided with longitudinal holes. A plate assembly is arranged in at least one opening of the steering column housing. The steering column housing may be advantageously manufactured from an extruded aluminum section. A central through hole of the steering column housing accommodates the steering axle, wherein the steering axle is held by at least two bearings pressed in directly.

15 Claims, 2 Drawing Sheets

STEERING COLUMN ASSEMBLY UNIT

FIELD OF THE INVENTION

The present invention pertains to a steering column assembly unit of an adjustable motor vehicle steering column with a steering axle, a steering column housing accommodating the steering axle, and a fastening means for the detachable fixation of the steering axle housing at a bracket, which is rigidly connected to the body, wherein the fastening means has at least one plate assembly fixed at the steering column housing.

BACKGROUND OF THE INVENTION

Steering column assembly units of this type are used in both passenger cars and trucks. The steering column housing is usually designed such that the steering axle proper is surrounded by a steering column jacket, in which the steering axle is accommodated rotatably by means of at least two bearings, e.g., in the form of ball bearings or slide bearings. To fix the steering column jacket at a body-side bracket, the steering column jacket is usually provided with sheet metal sections, which are welded, e.g., to the outside of the steering column jacket. In the steering column assembly units used now, which make possible the adjustment of the steering column in length, tilt and height to the needs of the user of the motor vehicle, so-called plate assemblies, which comprise sheet metal strips connected by spacers, are located on the outside of the sheet metal sections. The plate assemblies at the outside of the steering column housing cooperate with corresponding plate assemblies at the body-side bracket and are compressed in a defined, preselected position by suitable fastening means for locking the steering column.

Even though the usual design of the steering column housing with the steering column jacket and the brackets welded thereto has proved to be definitely meaningful in practice, it does have some drawbacks.

The connection between the steering column jacket and the sheet metal brackets is brought about by welding for safety reasons, which frequently leads to states of internal stress in the housing assembly unit, especially in terms of the satisfactory mounting of the steering axle, and it makes necessary expensive finishing operations, which are due to the warping of the corresponding parts caused by welding.

Furthermore, the following fact can be considered to be a drawback of the prior-art design: All the dimensional tolerances existing within the steering column jacket, the brackets as well as the individual sheet metal strips and spacers of the plate assembly are added up due to the plate assembly being arranged on the outside at the steering column jacket bearings. The steering column frame must therefore often be designed as a two-part frame to compensate the tolerances occurring, which is also associated with impairments in terms of the rigidity of the overall assembly group, besides drawbacks in terms of cost.

SUMMARY AND OBJECTS OF THE INVENTION

The primary object of the present invention is therefore to improve a steering column assembly unit of this type such that its design will be simplified, the efforts needed for assembly and manufacture are reduced, and the functionality of the entire unit is improved.

This object is accomplished according to the present invention by the steering axle housing comprising a one-piece component provided with longitudinal openings, and by at least one plate assembly being arranged in at least one of the openings of the steering axle housing.

The previously needed steering column jacket around the steering axle can be completely eliminated due to this design according to the present invention. Due to the novel design of the steering axle housing, no welding operations are needed any more to create a suitable mounting site for the plate assembly needed to fasten the steering column assembly unit. The cause of the previously frequently necessary finishing operations is thus eliminated. In addition, any adverse effect or occurring manufacturing tolerances of the plate assembly are avoided due to the arrangement of the plate assemblies within an opening of the steering column housing. The design according to the present invention results in a one-piece, rigid steering column housing without any assembly-related tensions.

The one-piece steering column housing with the openings needed for the plate assemblies is preferably manufactured as an extruded aluminum section. Such a manner of manufacture guarantees the highest possible precision of the dimensions as well as inexpensive manufacture, and, in addition, the material can be considered to be especially advantageous from the viewpoint of recycling. According to an advantageous embodiment of the subject of the present invention, a through hole for receiving the steering axle is arranged between the openings for the plate assemblies, and the steering axle is held in this hole by two bearings pressed in directly. A clearance-free, easily running mounting of the steering axle can be achieved due to this design embodiment as a result of the high manufacturing precision of usual extruded aluminum sections.

One exemplary embodiment of the subject of the present invention will be explained in greater detail below on the basis of a figure. Only the components essential for the present invention are shown in the figure attached for reasons of clarity.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
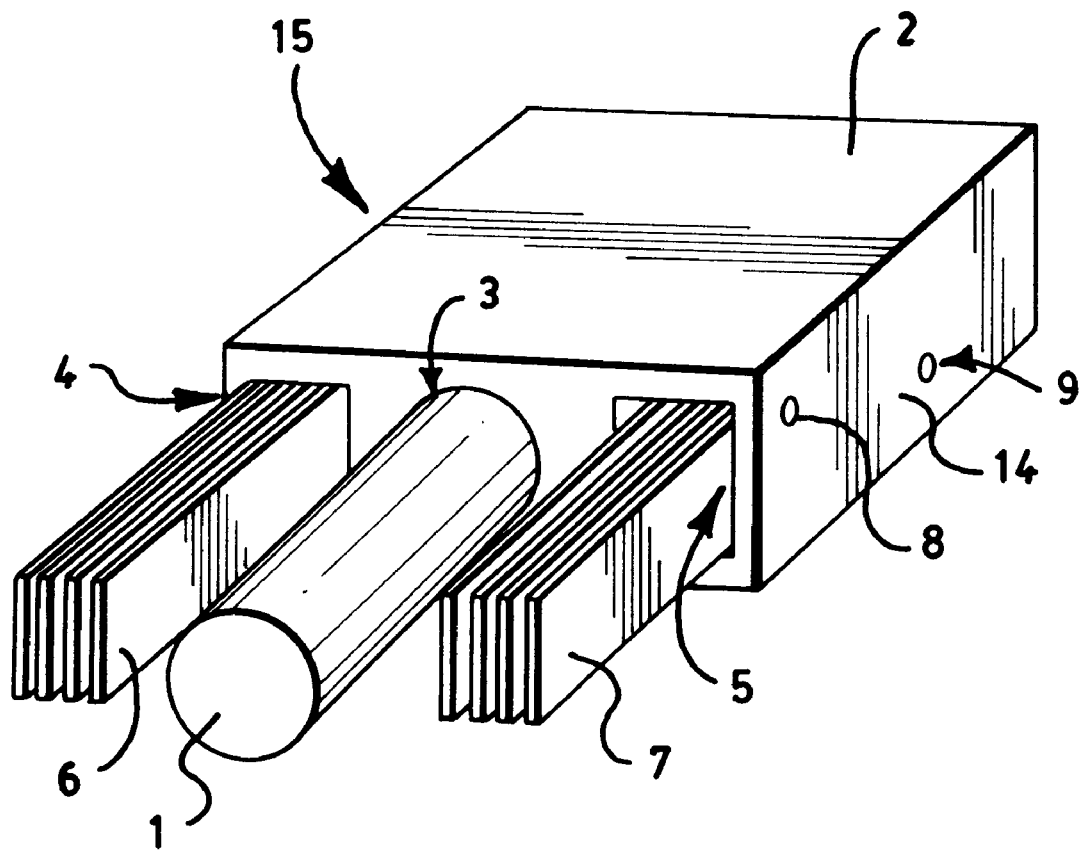
FIG. 1 is a perspective view of the steering column assembly unit according to the invention.

Referring to the drawings in particular, the FIG. 1 shows part of the motor vehicle steering column with the steering axle 1, which is mounted in a steering column housing 2 by means of deep groove ball bearings 10 (such deep groove ball bearings are themselves known). The steering axle is mounted by pressing at least two ball bearing units 10 into the opening for supporting the steering axle 1. The steering column housing 2 has an essentially parallelepipedic shape and is manufactured as a section of an extruded aluminum piece. Besides the central hole 3, in which the steering axle is mounted, this extruded section has two laterally arranged openings 4 and 5, which have an essentially rectangular cross section. One plate assembly 6 and 7 each is pushed into these openings and fastened by means of straight pins 9. These straight pins pass through passage openings 8, which are arranged in the outer side walls 14 and 15, respectively, of the extruded section.

Another cross-sectional shape, which may arise from the needs dictated in the area of the mounting, is, of course, also conceivable, besides the parallelepipedic shape of the steering column housing 2 shown here as an example.

Dimensional tolerances of the plate assemblies 6 and 7 that may occur are irrelevant for the outside dimensions of the steering column housing 2 due to the arrangement of the said plate assemblies 6 and 7 according to the present invention. Such a design of the steering column assembly unit with a one-piece steering axle housing without steering column jacket may be used with the above-mentioned advantages in manufacturing passenger cars as well as in trucks.

Figure 2:
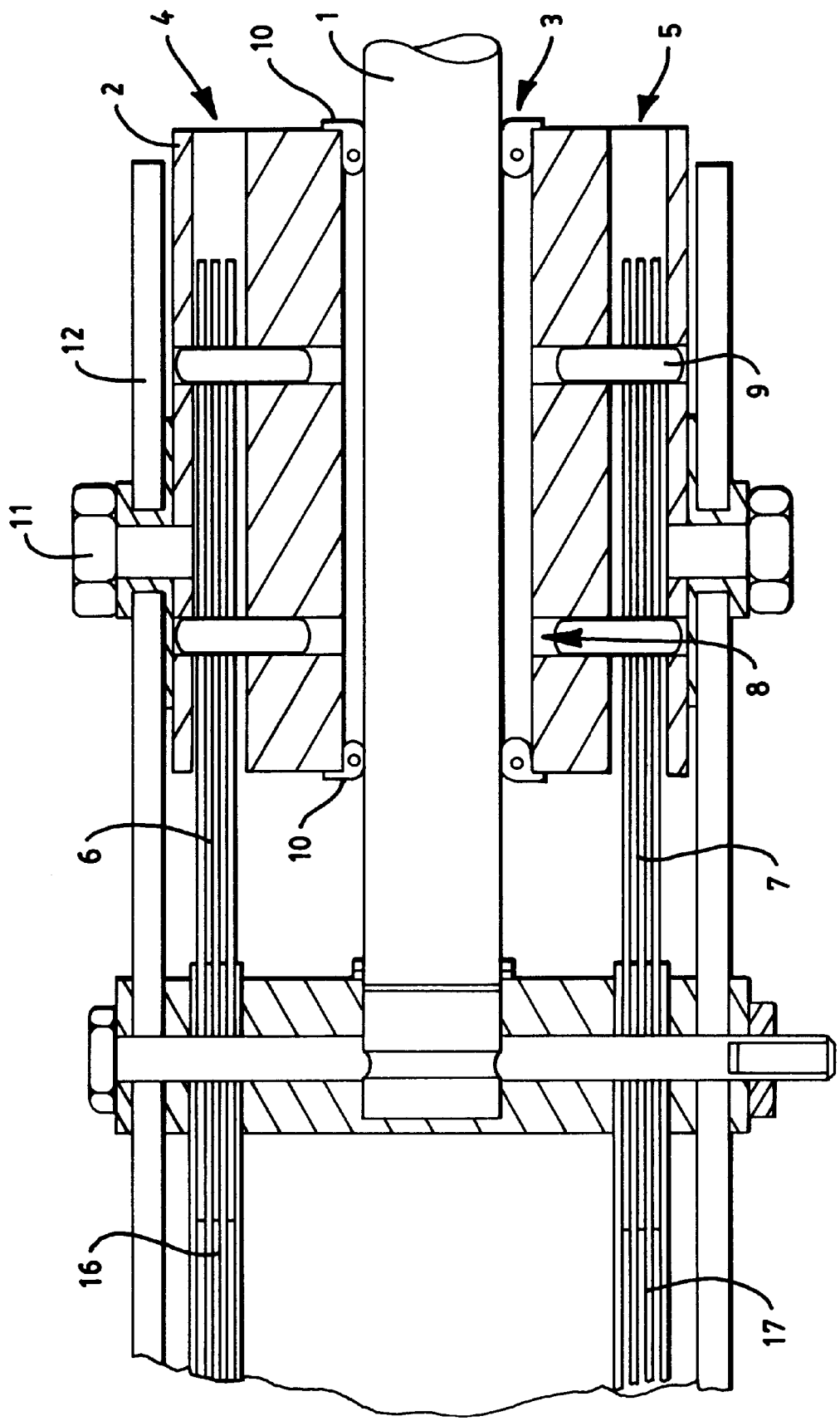
FIG. 2 is a sectional view of the steering column assembly unit connected to a vehicle part.

FIG. 2 shows the detachable fixing of the housing 2 at a bracket 12 rigidly connected to the body of the motor vehicle. The plate, assemblies 6 and 7 engage with second plate assemblies 16 and 17 and are clamped together via a clamping device 15. The bearings 10 can also be seen.

While a specific embodiment of the invention has been shown and described in detail to illustrate the application of the principles of the invention, it will be understood that the invention may be embodied otherwise without departing from such principles.

What is claimed is:

1. A steering column assembly unit of a motor vehicle steering column adjustable in height and tilt relative to a body of the motor vehicle, the assembly unit comprising:
    a steering axle;
    a steering column housing accommodating said steering axle, said steering column housing including a one-piece component provided with longitudinal openings, said steering axle extending into said housing and being held in said housing; and
    fastening means for the detachable fixation of the steering column housing at a bracket that is a rigid part of the body of the motor vehicle, wherein the fastening means has a plurality of plate assemblies non-detachably fixed to the steering column housing, said plate assemblies being arranged in at least one of said openings of said steering column housing.

2. Steering column assembly unit in accordance with claim 1, wherein said steering column housing is made of an extruded aluminum section.

3. Steering column assembly unit in accordance with claim 1, wherein said plate assemblies are held at said steering column housing by straight pins.

4. Steering column assembly unit in accordance with claim 1, further comprising two bearings, wherein said steering column housing has a central through hole for accommodating said steering axle and said steering axle is held in said central hole by said two bearings directly pressed in said central hole.

5. Steering column assembly unit in accordance with claim 1, wherein each said plate assembly includes a plurality of plates.

6. A steering column assembly unit of a motor vehicle steering column adjustable in height and tilt relative to a body of the motor vehicle, the assembly unit comprising:
    a steering axle;
    a steering column housing accommodating said steering axle, said steering column housing including a one-piece component provided with a plurality of longitudinal openings;
    a fastening device for the detachable fixation of the steering column housing at a bracket that is a rigid part of the body of the motor vehicle, the fastening device including
        a first plate assembly, arranged in at least one of said openings of said steering column housing and fixed to said steering column housing to substantially prevent relative movement between said first plate assembly and said steering column housing,
        a second plate assembly engaged with said first plate assembly and
        a clamping device for clamping together the first plate assembly and the second plate assembly.

7. The steering column assembly unit in accordance with claim 6, wherein said steering column housing is made of an extruded aluminum section.

8. The steering column assembly unit in accordance with claim 6, wherein said first and second plate assemblies are held at said steering column housing by straight pins.

9. The steering column assembly unit in accordance with claim 6, further comprising two bearings, wherein said steering column housing has a central through hole for accommodating said steering axle and said steering axle is held in said central hole by said two bearings directly pressed in said central hole.

10. The steering column assembly unit in accordance with claim 6, wherein said first plate assembly is arranged fixed to said steering column housing by a pin extending through a passage opening of said steering column housing and through said first plate assembly to substantially prevent movement of said first plate assembly in said at least one of said openings of said steering column housing.

11. A steering column assembly unit of a motor vehicle steering column adjustable in height and tilt relative to a body of the motor vehicle, the assembly unit comprising:
    a steering axle;
    a steering column housing accommodating said steering axle, said steering column housing including a one-piece component provided with a plurality of longitudinal openings, said steering axle extending into one of said openings;
    a fastening device for the detachable fixation of the steering column housing at a bracket that is a rigid part of the body of the motor vehicle, the fastening device including a first and second plate assembly arranged in at least one of said openings of said steering column housing;
    a fixing device for substantially preventing movement of said plate assemblies within said at least one of said openings of said steering column housing.

12. The steering column assembly unit in accordance with claim 11, wherein said fixing device is a pin extending through a passage opening of said steering column housing and through said plate assemblies to substantially prevent movement of said first plate assembly in said at least one of said openings of said steering column housing and fixed to said steering column housing to substantially prevent relative movement between said plate assembly and said steering column housing.

13. The steering column assembly unit in accordance with claim 11, wherein said steering column housing is made of an extruded aluminum section.

14. The steering column assembly unit in accordance with claim 11, further comprising two bearings, wherein said opening accommodating said steering axle is a central through hole and said steering axle is held in said central hole by two bearings directly pressed in a surface of said central hole.

15. The steering column assembly unit in accordance with claim 11, wherein said fastening device further comprises:

the second plate assembly engaged with said first plate assembly and a clamping device for clamping together the first plate assembly and the second plate assembly.

* * * * *